United States Patent
Ikeda et al.

(10) Patent No.: US 10,968,847 B2
(45) Date of Patent: Apr. 6, 2021

(54) DEVICE AND METHOD FOR CONTROLLING INTERNAL COMBUSTION ENGINE

(71) Applicant: TOYOTA JIDOSHA KABUSHIKI KAISHA, Toyota (JP)

(72) Inventors: Yuto Ikeda, Toyota (JP); Yuki Nose, Kasugai (JP); Yoshiyuki Shogenji, Toyota (JP); Hirokazu Ando, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/539,159

(22) Filed: Aug. 13, 2019

(65) Prior Publication Data
US 2020/0063675 A1 Feb. 27, 2020

(30) Foreign Application Priority Data

Aug. 21, 2018 (JP) .............................. JP2018-154498

(51) Int. Cl.
| | |
|---|---|
| *F02D 41/00* | (2006.01) |
| *F02D 41/02* | (2006.01) |
| *F01N 3/035* | (2006.01) |
| *F01N 3/10* | (2006.01) |
| *F02M 25/08* | (2006.01) |

(Continued)

(52) U.S. Cl.
CPC ....... *F02D 41/0042* (2013.01); *F01N 3/0253* (2013.01); *F01N 3/035* (2013.01); *F01N 3/101* (2013.01); *F02D 41/0032* (2013.01); *F02D 41/0035* (2013.01); *F02D 41/0045* (2013.01); *F02D 41/025* (2013.01); *F02D 41/029* (2013.01); *F02M 25/08* (2013.01); *F02M 25/089* (2013.01); *B60K 6/44* (2013.01); *B60Y 2200/92* (2013.01); *B60Y 2300/432* (2013.01); *B60Y 2300/47* (2013.01)

(58) Field of Classification Search
CPC . F02D 41/0035; F02D 41/0042; F02D 41/027
See application file for complete search history.

(56) References Cited

U.S. PATENT DOCUMENTS

| | | | | |
|---|---|---|---|---|
| 5,497,757 A | * | 3/1996 | Osanai ................ | F02D 41/0045 123/674 |
| 5,520,160 A | * | 5/1996 | Aota ................... | F02D 41/0032 123/520 |

(Continued)

FOREIGN PATENT DOCUMENTS

DE 69915548 T2 2/2005

*Primary Examiner* — Kevin R Steckbauer
(74) *Attorney, Agent, or Firm* — Oliff PLC

(57) ABSTRACT

A control device for an internal combustion engine includes processing circuitry. The processing circuitry is configured to execute a purging process that draws the fuel vapor trapped in the canister into the intake passage by controlling the purge valve, a fuel feeding process that feeds the air-fuel mixture, which includes the fuel supplied to the cylinder, to the exhaust passage without burning the air-fuel mixture in the cylinder, and a fuel supply process that supplies fuel to the cylinder when the fuel feeding process is being performed. The processing circuitry is further configured to perform the fuel supply process by performing the purging process.

9 Claims, 4 Drawing Sheets

(51) Int. Cl.
*F01N 3/025* (2006.01)
*B60K 6/44* (2007.10)

(56) References Cited

U.S. PATENT DOCUMENTS

| | | | | |
|---|---|---|---|---|
| 5,546,917 A * | 8/1996 | Osanai | ................ | F02D 41/0042 123/674 |
| 5,596,972 A * | 1/1997 | Sultan | ................ | F02D 41/0045 123/520 |
| 6,089,210 A * | 7/2000 | Kadowaki | .............. | F02M 25/08 123/198 D |
| 6,283,088 B1 * | 9/2001 | Takagi | ................ | F02D 41/0032 123/295 |
| 6,363,908 B1 * | 4/2002 | Kerns | ................ | F02D 41/0042 123/295 |
| 6,453,887 B1 * | 9/2002 | Hayashi | ................ | F02D 41/40 123/520 |
| 6,595,190 B1 * | 7/2003 | Sealy | ................ | F02D 41/0032 123/518 |
| 6,651,631 B2 * | 11/2003 | Hayashi | .............. | F02D 41/0045 123/520 |
| 6,651,640 B1 * | 11/2003 | Sealy | ................ | F02D 41/0045 123/520 |
| 7,007,684 B2 * | 3/2006 | Itakura | ................ | F02D 41/0042 123/520 |
| 7,234,447 B2 * | 6/2007 | Okubo | ................ | F02D 41/0042 123/431 |
| 7,367,180 B2 * | 5/2008 | Surnilla | .............. | F02D 41/0032 60/285 |
| 7,418,953 B2 * | 9/2008 | Annoura | ............. | F02D 41/0042 123/519 |
| 7,647,766 B2 * | 1/2010 | Surnilla | ................ | F01N 3/101 60/285 |
| 8,020,373 B2 * | 9/2011 | Hermansson | ......... | F02D 41/003 60/286 |
| 9,394,837 B2 * | 7/2016 | Ulrey | ..................... | F02D 37/02 |
| 9,416,747 B2 * | 8/2016 | Mashiki | .............. | F02D 41/0032 |
| 9,453,471 B2 * | 9/2016 | Mano | ................. | F02D 41/1486 |
| 9,638,125 B2 * | 5/2017 | Tanaka | ................ | F02D 41/1454 |
| 9,897,044 B2 * | 2/2018 | Tanaka | ................ | F02D 41/123 |
| 2002/0129797 A1 * | 9/2002 | Hayashi | .............. | F02D 41/0032 123/520 |
| 2002/0129802 A1 * | 9/2002 | Hayashi | .............. | F02D 41/0045 123/698 |
| 2005/0193720 A1 * | 9/2005 | Surnilla | .............. | F02D 41/0032 60/285 |
| 2005/0274353 A1 * | 12/2005 | Okubo | ................. | F02M 63/029 123/299 |
| 2005/0274368 A1 * | 12/2005 | Itakura | ............... | F02D 41/0042 123/698 |
| 2007/0186915 A1 * | 8/2007 | Annoura | ............. | F02D 41/0042 123/698 |
| 2008/0066450 A1 * | 3/2008 | Surnilla | .............. | F02D 41/0082 60/285 |
| 2008/0148718 A1 * | 6/2008 | Hermansson | ......... | F02D 41/003 60/295 |
| 2011/0048393 A1 * | 3/2011 | Akita | .................. | F02D 41/0032 123/704 |
| 2014/0041362 A1 * | 2/2014 | Ulrey | ................... | F02D 41/0087 60/274 |
| 2014/0230793 A1 * | 8/2014 | Mashiki | .............. | F02D 41/3863 123/478 |
| 2015/0369148 A1 * | 12/2015 | Mano | .................... | F02D 41/004 123/521 |
| 2016/0230707 A1 * | 8/2016 | Tanaka | ..................... | F01N 3/20 |
| 2016/0237926 A1 * | 8/2016 | Tanaka | ............... | F02D 41/0235 |
| 2019/0128198 A1 * | 5/2019 | Ban | ..................... | F02D 41/0042 |

* cited by examiner

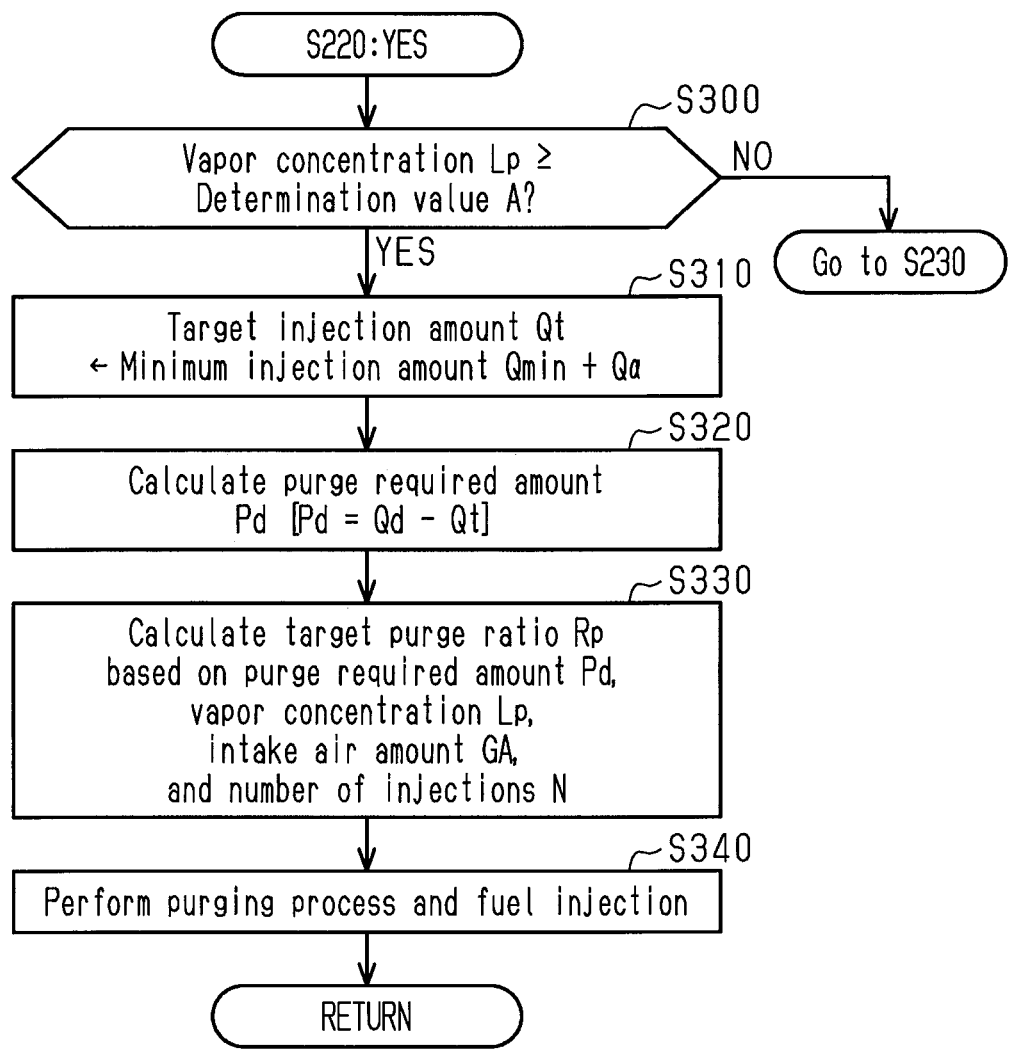

DEVICE AND METHOD FOR CONTROLLING INTERNAL COMBUSTION ENGINE

BACKGROUND

1. Field

The present disclosure relates to a device and a method for controlling an internal combustion engine.

2. Description of Related Art

US Patent Application Publication No. 2014/41362 discloses a spark-ignited internal combustion engine. The spark-ignited internal combustion engine includes a three-way catalyst arranged in an exhaust passage and a filter arranged in the exhaust passage at a downstream side of the three-way catalyst to remove particulate matter from the exhaust gas.

A fuel feeding process is performed to increase the temperature of the three-way catalyst to burn and remove the particulate matter deposited on the filter. In the fuel feeding process, fuel is injected into a cylinder in a state in which the spark discharge of an ignition plug is stopped so that the air-fuel mixture is drawn into the exhaust passage without being burned in the cylinder. The unburned air-fuel mixture drawn into the exhaust passage then flows into the three-way catalyst and is burned in the three-way catalyst. When the heat generated by the combustion increases the temperature of the three-way catalyst, the temperature of the gas flowing from the three-way catalyst to the filter is also increased. Then, the heat of the high temperature gas increases the temperature of the filter to the ignition temperature of the particulate matter or higher so that the particulate matter deposited on the filter is burned and removed. In this fuel feeding process, in order to prevent the three-way catalyst from being overheated by excessively supplied fuel, the fuel injection amount is decreased as compared to when the air-fuel mixture, which includes fuel, is burned in the cylinder.

In the above internal combustion engine, the fuel feeding process injects and supplies fuel from a fuel injection valve to the cylinder and consumes the fuel stored in a fuel tank. Thus, the fuel feeding process lowers the fuel efficiency.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a control device for an internal combustion engine is provided. The internal combustion engine includes a fuel tank containing fuel, a fuel injection valve configured to inject the fuel from the fuel tank, a cylinder into which air-fuel mixture including the fuel injected by the fuel injection valve is drawn, an ignition device configured to spark-ignite the air-fuel mixture drawn into the cylinder, an exhaust passage through which exhaust gas discharged from the cylinder flows, an intake passage configured to draw intake air into the cylinder, a three-way catalyst arranged in the exhaust passage, a canister configured to trap fuel vapor generated in the fuel tank, a purge passage configured to draw the fuel vapor trapped in the canister into the intake passage, and a purge valve configured to adjust a flow rate of the fuel vapor flowing through the purge passage. The control device includes processing circuitry. The processing circuitry is configured to execute a purging process that draws the fuel vapor trapped in the canister into the intake passage by controlling the purge valve, a fuel feeding process that feeds the air-fuel mixture, which includes the fuel supplied to the cylinder, to the exhaust passage without burning the air-fuel mixture in the cylinder, and a fuel supply process that supplies fuel to the cylinder when the fuel feeding process is being performed. The processing circuitry is further configured to perform the fuel supply process by performing the purging process.

In another general aspect, a method for controlling an internal combustion engine is provided. The internal combustion engine includes a fuel tank containing fuel, a fuel injection valve configured to inject the fuel from the fuel tank, a cylinder into which air-fuel mixture including the fuel injected by the fuel injection valve is drawn, an ignition device configured to spark-ignite the air-fuel mixture drawn into the cylinder, an exhaust passage through which exhaust gas discharged from the cylinder flows, an intake passage configured to draw intake air into the cylinder, a three-way catalyst arranged in the exhaust passage, a canister configured to trap fuel vapor generated in the fuel tank, a purge passage configured to draw the fuel vapor trapped in the canister into the intake passage, and a purge valve configured to adjust a flow rate of the fuel vapor flowing through the purge passage. The method includes performing a purging process that draws the fuel vapor trapped in the canister into the intake passage by controlling the purge valve, performing a fuel feeding process that feeds the air-fuel mixture, which includes the fuel supplied to the cylinder, to the exhaust passage without burning the air-fuel mixture in the cylinder, performing a fuel supply process that supplies fuel to the cylinder when the fuel feeding process is being performed, and performing the fuel supply process by performing the purging process.

Other features and aspects will be apparent from the following detailed description, the drawings, and the claims.

BRIEF DESCRIPTION OF THE DRAWINGS

FIG. 4 is a flowchart illustrating part of a procedure of a fuel supply process executed in accordance with a second embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A control device for an internal combustion engine in accordance with the first embodiment will now be described with reference to FIGS. 1 to 3.

Figure 1:
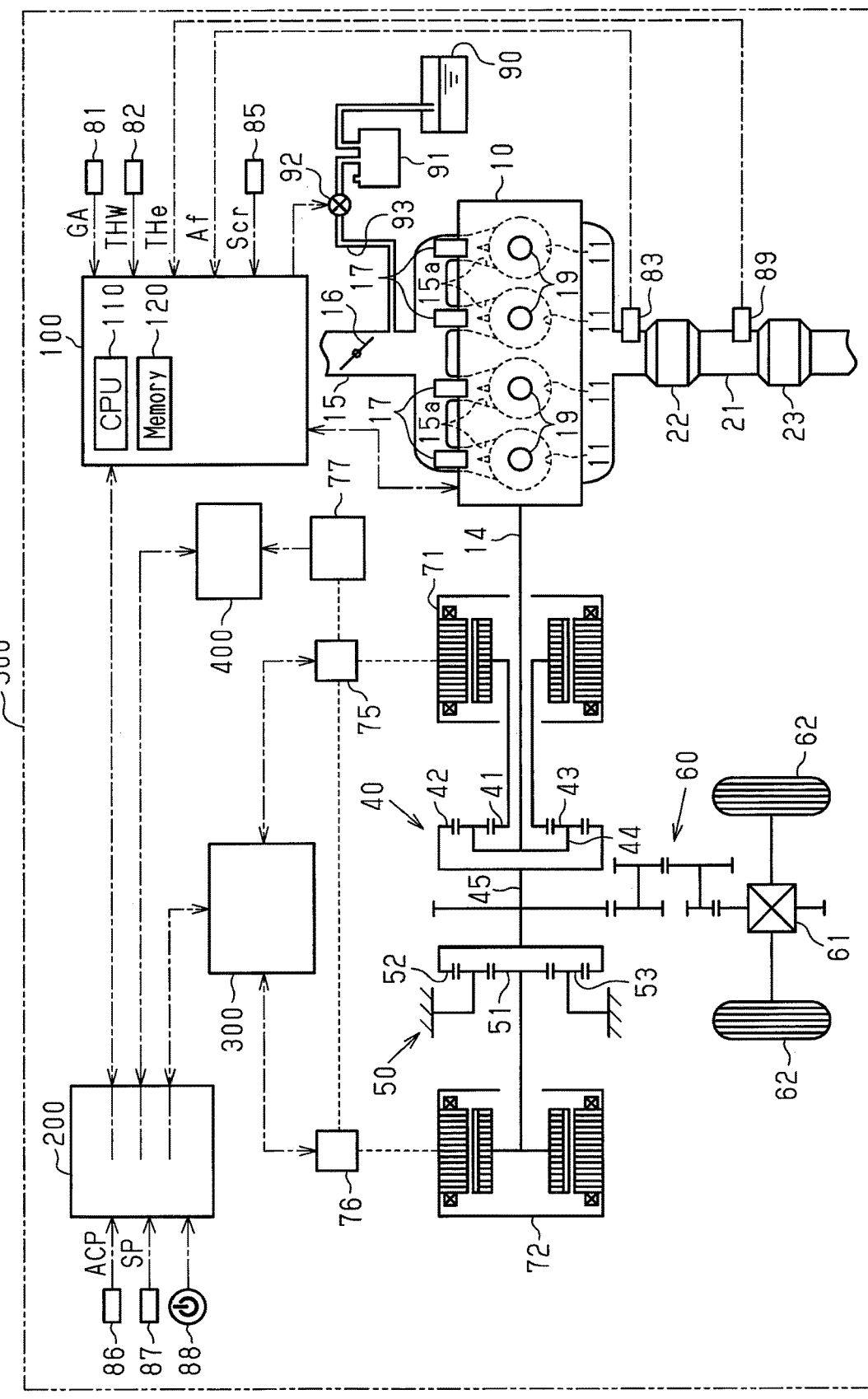
FIG. 1 is a schematic diagram showing the structure of a hybrid vehicle including a control device for an internal combustion engine in accordance with a first embodiment.

As shown in FIG. 1, a control device of the first embodiment is applied to a spark-ignited internal combustion engine 10, which is installed in a hybrid vehicle (hereafter, referred to as "the vehicle") 500. The vehicle 500 includes two motor generators, namely, a first motor generator 71 and a second motor generator 72. The motor generators 71 and 72 each function as a motor and a generator. Further, the vehicle 500 includes a battery 77, a first inverter 75, and a second inverter 76. The battery 77 stores power generated by the first motor generator 71 and the second motor generator 72 when the first motor generator 71 and the second motor generator 72 function as generators. Further, the battery 77 supplies the stored power to the first motor generator 71 and the second motor generator 72 when the first motor generator 71 and the second motor generator function as motors. The first inverter 75 adjusts the amount of power transferred between the first motor generator 71 and the battery 77, and the second inverter 76 adjusts the amount of power transferred between the second motor generator 72 and the battery 77.

The vehicle 500 includes a first planetary gear mechanism 40. The first planetary gear mechanism 40 includes a sun gear 41, which is an external gear, and a ring gear 42, which is an internal gear and is arranged coaxially with the sun gear 41. A plurality of pinion gears 43 are located between the sun gear 41 and the ring gear 42 and meshed with both the sun gear 41 and the ring gear 42. Each pinion gear 43 is supported by a carrier 44 in a manner allowing the pinion gear 43 to orbit and rotate freely. The carrier 44 of the first planetary gear mechanism 40 is coupled to a crankshaft 14, which is an output shaft of the internal combustion engine 10. The sun gear 41 is coupled to the first motor generator 71. Further, the ring gear 42 is connected to a ring gear shaft 45. The ring gear shaft 45 is coupled to driving wheels 62 by a reduction gear mechanism 60 and a differential mechanism 61. In addition, the ring gear shaft 45 is coupled to the second motor generator 72 by a second planetary gear mechanism 50.

The second planetary gear mechanism 50 includes a sun gear 51, which is an external gear, and a ring gear 52, which is an internal gear and is arranged coaxially with the sun gear 51. A plurality of pinion gears 53 are located between the sun gear 51 and the ring gear 52 and meshed with both the sun gear 51 and the ring gear 52. Each pinion gear 53 is rotational but is not allowed to orbit. Further, the ring gear 52 of the second planetary gear mechanism 50 is connected to the ring gear shaft 45, and the sun gear 51 is connected to the second motor generator 72.

The internal combustion engine 10 includes a plurality of cylinders 11 that burn an air-fuel mixture. Further, the internal combustion engine 10 includes an intake passage 15, which is a passage through which air is drawn into each cylinder 11. The intake passage 15 includes a throttle valve 16 that adjusts an intake air amount. A portion of the intake passage 15 at the downstream side of the throttle valve 16 is branched to each cylinder. The portion of the intake passage 15 branched to each cylinder 11 is connected to an intake port 15a of the cylinder 11. That is, each cylinder 11 is provided with an intake port 15a. Each intake port 15a is provided with a fuel injection valve 17 that injects fuel from a fuel tank 90. The fuel injection valve 17 is designed so that the amount of injected fuel is in a permitted usage range so that the fuel injection amount can be properly controlled. In other words, the fuel injection amount, which is the amount of fuel injected from the fuel injection valve 17, needs to be in a predetermined range to allow for proper control. Hereinafter, a lower limit value of the fuel injection amount in the predetermined range will be referred to as the minimum injection amount Qmin.

Each cylinder 11 includes an ignition device 19 that ignites the air-fuel mixture drawn into the cylinder 11 with a spark discharge. Further, the internal combustion engine 10 includes an exhaust passage 21 serving as a discharge passage through which exhaust gas generated by the combustion of air-fuel mixture in each cylinder 11 flows. A three-way catalyst 22 is arranged in the exhaust passage 21 to purify the exhaust gas. Further, a filter 23 is arranged in the exhaust passage 21 at a downstream side of the three-way catalyst 22 to remove particulate matter from the exhaust gas.

The air-fuel mixture including the fuel injected from the fuel injection valve 17 is drawn into each cylinder 11 of the internal combustion engine 10. When the ignition device 19 ignites the air-fuel mixture, the air-fuel mixture is burned in the cylinder 11. The exhaust gas generated by the combustion is discharged from the cylinder 11 to the exhaust passage 21. In the internal combustion engine 10, the three-way catalyst 22 oxidizes HC and CO and reduces NOx in the exhaust gas. Further, the filter 23 removes the particulate matter from the exhaust gas to purify the exhaust gas.

The internal combustion engine 10 further includes a fuel vapor processing device that draws the fuel vapor generated in the fuel tank 90 to the intake passage 15 to process the fuel vapor in the cylinder 11. The fuel vapor processing device includes a canister 91, a purge passage 93, a purge valve 92, and the like. The canister 91 traps the fuel vapor generated in the fuel tank 90. The purge passage 93 draws the fuel vapor trapped in the canister 91 into a portion of the intake passage 15 at a downstream side of the throttle valve 16. The purge valve 92 is provided at an intermediate portion in the purge passage 93 to adjust the flow rate of the fuel vapor flowing through the purge passage 93.

The vehicle 500 includes an engine control device 100, a motor control device 300, and a vehicle control device 200. The engine control device 100 executes various controls on the internal combustion engine 10. The motor control device 300 executes various controls on the first motor generator 71 and the second motor generator 72. The vehicle control device 200 centrally controls the engine control device 100 and the motor control device 300. Further, the vehicle 500 includes a battery monitoring device 400 that monitors the state of charge (SOC) of the battery 77.

The battery monitoring device 400 is connected to the battery 77. The battery monitoring device 400 includes a central processing unit (CPU) and a memory. Data related to current IB, voltage VB, and temperature TB of the battery 77 is input to the battery monitoring device 400. The battery monitoring device 400 executes programs stored in the memory with the CPU in accordance with the current IB, the voltage VB, and the temperature TB to calculate the SOC of the battery 77.

The motor control device 300 is connected to the first inverter 75 and the second inverter 76. The motor control device 300 includes a central processing unit (CPU) and a memory. The motor control device 300 executes programs stored in the memory with the CPU to control the amount of power supplied from the battery 77 to the first motor generator 71 and the second motor generator 72 and the amount of power supplied from the first motor generator 71 and the second motor generator 72 to the battery 77 (i.e., charging amount).

The engine control device 100, the motor control device 300, and the battery monitoring device 400 are connected to the vehicle control device 200 via communication ports. The vehicle control device 200 also includes a central processing unit (CPU) and a memory. The engine control device 100 executes programs stored in the memory with the CPU to execute various controls.

The vehicle control device 200 receives data related to the SOC of the battery 77 from the battery monitoring device 400. Further, the vehicle control device 200 is connected to an accelerator pedal sensor 86 for detecting the amount the accelerator pedal is depressed by a driver (accelerator operation amount ACP), a vehicle speed sensor 87 for detecting a vehicle speed SP, which is the traveling speed of the vehicle 500, and a power switch 88. The vehicle control device 200 receives output signals from the sensors. The power switch 88 is a switch for activating the system of the hybrid vehicle 500. When the vehicle driver turns on the power switch 88, the vehicle 500 is in a drivable state.

The vehicle control device 200 calculates a vehicle-required power, which is a required value of the driving force of the vehicle 500, based on the accelerator operation amount ACP and the vehicle speed SP. In addition, the vehicle control device 200 calculates an engine-required torque, a first motor-required torque, and a second motor-required torque based on the vehicle-required power, the SOC, and the like. The engine-required torque is a required value of output torque of the internal combustion engine 10. The first motor-required torque is a required value of a driving torque or a regenerative torque of the first motor generator 71. The second motor-required torque is a required value of a driving torque or a regenerative torque of second motor generator 72. Torque control that is necessary for driving the vehicle 500 is executed with the engine control device 100 that controls the output power of the internal combustion engine 10 in accordance with the engine-required torque, and the motor control device 300 that controls the torque of the first motor generator 71 and the second motor generator 72 in accordance with the first motor-required torque and the second motor-required torque.

The engine control device 100 includes a central processing unit (hereinafter, referred to as the CPU) 110 and a memory 120, which stores control programs and data. The engine control device 100 executes programs stored in the memory 120 with the CPU 110 to execute various engine controls.

The engine control device 100 is connected to an air flowmeter 81, a coolant temperature sensor 82, and a crank angle sensor 85. The air flowmeter 81 is an intake air amount sensor that detects an intake air amount GA, which is expressed as mass flow rate. The coolant temperature sensor 82 detects a coolant temperature THW, which is the temperature of the coolant of the internal combustion engine 10. The crank angle sensor 85 detects a rotation angle of the crankshaft 14. The engine control device 100 receives output signals from the sensors. The engine control device 100 is also connected to an air-fuel ratio sensor 83 and receives an output signal from the air-fuel ratio sensor 83. The air-fuel ratio sensor 83 is provided in the exhaust passage 21 at an upstream side of the three-way catalyst 22 and detects the oxygen concentration in the exhaust gas, that is, an air-fuel ratio AF of the air-fuel mixture. Further, the engine control device 100 is connected to a temperature sensor 89 and receives an output signal from the temperature sensor 89. The temperature sensor 89 is provided in the exhaust passage 21 between the three-way catalyst 22 and the filter 23 and detects a catalyst outgoing gas temperature THe, which is the temperature of the exhaust gas after passing through the three-way catalyst 22.

The engine control device 100 calculates an engine rotation speed NE based on an output signal Scr of the crank angle sensor 85. In addition, the engine control device 100 calculates an engine load factor KL based on the engine rotation speed NE and the intake air amount GA. The engine load factor KL is the ratio of the current cylinder inflow air amount at the current engine rotation speed NE to the cylinder inflow air amount when the internal combustion engine 10 is operated in a steady state with the throttle valve 16 fully open. The cylinder inflow air amount is the amount of air flowing into each cylinder 11 in an intake stroke.

The engine control device 100 calculates a catalyst temperature Tsc, which is the temperature of the three-way catalyst 22, and a filter temperature Tf, which is the temperature of the filter 23, based on the catalyst outgoing gas temperature THe and various engine operational states such as an intake charging efficiency and the engine rotation speed NE. Further, the engine control device 100 calculates a PM deposition amount Ps, which is the amount of particulate matter deposited on the filter 23, based on the engine rotation speed NE, the engine load factor KL, the filter temperature Tf, and the like.

Furthermore, the engine control device 100 calculates an air-fuel ratio correction value FAF to decrease the difference between the air-fuel ratio AF, which is a detection value of the air-fuel ratio sensor 83, and a target air-fuel ratio AFt. Then, the engine control device 100 executes an air-fuel ratio feedback control to correct the fuel injection amount of the fuel injection valve 17 using the air-fuel ratio correction value FAF.

Moreover, the engine control device 100 performs a purging process to draw the fuel vapor trapped in the canister 91 into the intake passage 15 by controlling an opening degree of the purge valve 92.

In this purging process, a target purge ratio Rp is calculated based on the intake charging efficiency and a vapor concentration Lp, which is the concentration of the fuel vapor supplied to the cylinder 11 (mass ratio of fuel included in fluid flowing from canister 91 to intake passage 15). Here, the purge ratio is a value obtained by dividing a mass flow rate FV of a fluid flowing from the canister 91 to the intake passage 15 by the intake air amount GA (FV/GA). In order to control the purge ratio to the target purge ratio Rp, an opening degree instruction value of the purge valve 92 is calculated. Specifically, the opening degree instruction value of the purge valve 92 is calculated based on the intake air amount GA. Subsequently, the purge valve 92 is operated so that the opening degree of the purge valve 92 becomes equal to the opening degree corresponding to the opening degree instruction value. When the target purge ratio Rp is the same, the opening degree instruction value is calculated to decrease the opening degree of the purge valve 92 as the intake air amount GA decreases. This is because when the intake air amount GA decreases, the pressure in the intake passage 15 becomes lower than the pressure in the canister 91 and fluid flows more easily from the canister 91 to the intake passage 15.

Further, when the purging process is being performed in a state in which the target purge ratio Rp is set to a value greater than "0", the air-fuel ratio AF may deviate from the target air-fuel ratio AFt. In the first embodiment, the deviation of the air-fuel ratio AF from the target air-fuel ratio AFt is always considered as having resulted from the fuel vapor flowing into the cylinder 11 from the canister 91. Thus, the air-fuel ratio correction value FAF calculated when the purging process is being performed reflects the vapor concentration Lp. In this regard, the engine control device 100 calculates the vapor concentration Lp based on the air-fuel ratio correction value FAF calculated when the purging process is being performed.

The vehicle control device 200 requests the engine control device 100 to stop combustion in the internal combustion engine 10 when the vehicle 500 is stopped or traveling at a low speed under the condition that the SOC of the battery 77 is greater than a specified charge requiring value. When there is such a request to stop combustion, the engine control device 100 stops both the fuel injection of the fuel injection valve 17 and the spark discharge of the ignition device 19 to stop combustion in the internal combustion engine 10.

As described above, in the internal combustion engine 10, the filter 23 provided in the exhaust passage 21 removes fine particulate matter from the exhaust gas. Deposition of the removed fine particulate matter on the filter 23 clogs the filter 23. In order to burn and remove the deposited fine particulate matter from the filter 23, the temperature of the filter 23 needs to be increased to the ignition temperature of the fine particulate matter or higher. As the temperature (catalyst temperature) of the three-way catalyst 22 provided in the exhaust passage 21 at an upstream side of the filter 23 increases, the temperature of the gas flowing from the three-way catalyst 22 to the filter 23 also increases. Further, the temperature of the filter 23 is increased by the heat received from the high temperature gas flowing through the filter 23. Thus, the fine particulate matter deposited on the filter 23 can be burned and removed by increasing the temperature of the three-way catalyst 22. Accordingly, in the first embodiment, when the deposition amount of the fine particulate matter on the filter 23 increases, a control to increase the catalyst temperature is executed to burn and remove the deposited fine particulate matter, that is, a catalyst temperature increase control is executed.

Figure 2:
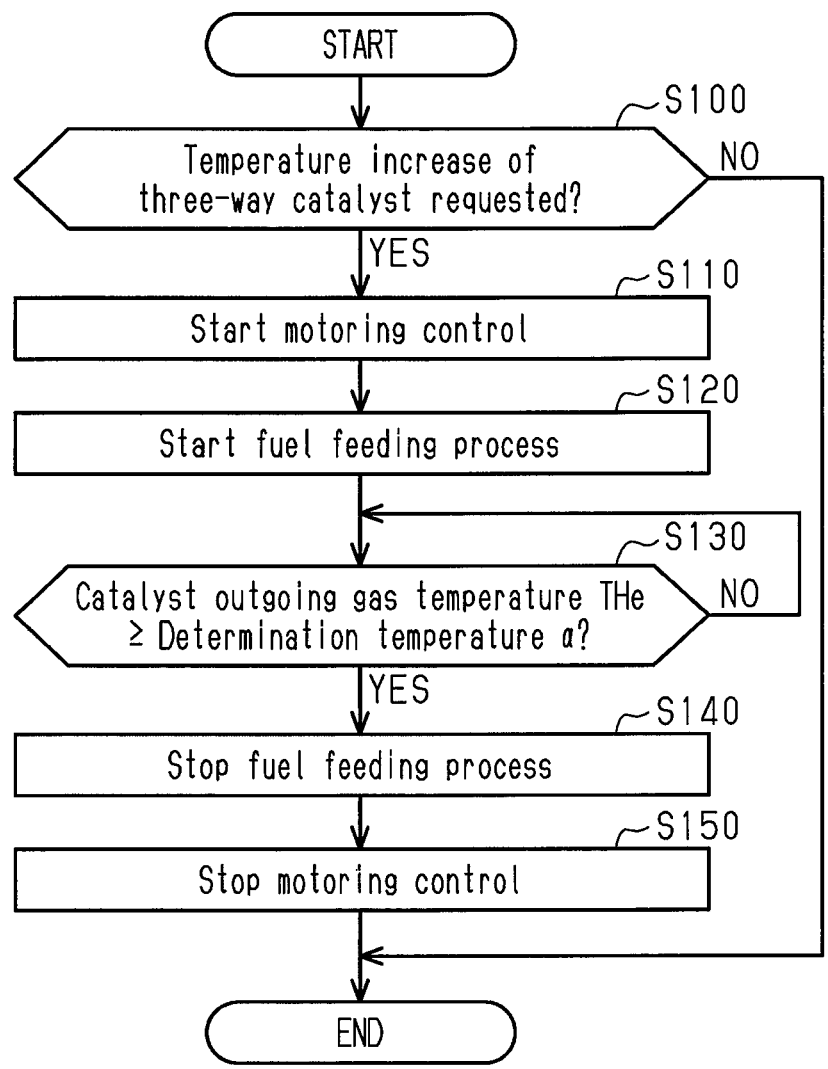
FIG. 2 is a flowchart illustrating the procedure of a catalyst temperature increase control executed by the control device shown in FIG. 1.

FIG. 2 illustrates the procedure of the catalyst temperature increase control. The series of processes illustrated in FIG. 2 is started in a state in which combustion is stopped in the internal combustion engine 10 and the rotation of the crankshaft 14 is stopped. The processes are implemented by the CPU 110 executing programs stored in the memory 120 of the engine control device 100. In the following description, the number of each step is represented by the letter "S" followed by a numeral.

When the process of the catalyst temperature increase control is started, the CPU 110 first determines whether there is a temperature increase request for the three-way catalyst 22 (S100). In the first embodiment, the CPU 110 determines that there is a temperature increase request for the three-way catalyst 22 when the PM deposition amount Ps is greater than a predetermined specified amount and the catalyst outgoing gas temperature THe is lower than a regenerable temperature of the filter 23. The regenerable temperature is set to the lower limit value of the catalyst outgoing gas temperature THe necessary to increase the temperature of the filter 23 to the ignition temperature of fine particulate matter or higher.

When it is determined that there is no temperature increase request for the three-way catalyst 22 (S100: NO), the CPU 110 ends the process of the current catalyst temperature increase control.

When it is determined that there is a temperature increase request for the three-way catalyst 22 (S100: YES), the CPU 110 starts a motoring control (S110). The motoring control is a control that rotates the crankshaft 14 with the power of the first motor generator 71 in a state in which combustion is stopped in the internal combustion engine 10. When the motoring control is started to rotate the crankshaft 14, intake and exhaust are performed in each cylinder 11 of the internal combustion engine 10.

In the motoring control, the rotation speed of the first motor generator 71 is controlled such that the engine rotation speed NE becomes greater than or equal to a specified temperature increasing rotation speed y. The temperature increasing rotation speed y is set to an engine rotation speed at which the flow rate of air discharged to the exhaust passage 21 is the minimum flow rate necessary to increase the catalyst temperature.

When the motoring control is started, the CPU 110 starts a fuel feeding process (S120). In the fuel feeding process, the fuel is supplied to the cylinder 11 in a state in which the spark discharge of the ignition devices 19 is stopped. When the fuel feeding process is being performed, the amount of fuel supplied to the cylinder 11 is adjusted so that the air-fuel ratio of the air-fuel mixture in the cylinder 11 is leaner than the stoichiometric air-fuel ratio. Further, in the fuel feeding process, in order to prevent the three-way catalyst 22 from being overheated by excessively supplied fuel, the fuel injection amount of the fuel injection valve 17 is decreased compared to when the air-fuel mixture including fuel is burned in the cylinder 11.

When the fuel feeding process is started in S120, intake and exhaust are performed in each cylinder 11 through the motoring control so that the air-fuel mixture supplied to the cylinder 11 is fed unburned to the exhaust passage 21. Then, the unburned air-fuel mixture flows into the three-way catalyst 22 and is burned in the three-way catalyst 22. This increases the catalyst temperature.

Subsequently, the CPU 110 determines whether the catalyst outgoing gas temperature THe is greater than or equal to a specified determination temperature a (S130). The determination temperature a is set to a temperature higher than the above-mentioned regenerable temperature.

When the catalyst outgoing gas temperature THe is lower than the specified determination temperature a (S130: NO), the CPU 110 repeats the process of S130.

When the catalyst outgoing gas temperature THe is greater than or equal to the specified determination temperature a (S130: YES), the CPU 110 stops the fuel feeding process by stopping the supply of fuel to the cylinder 11 (S140). The CPU 110 also stops the motoring control (S150). Then, the CPU 110 ends the process of the current catalyst temperature increase control.

Figure 3:
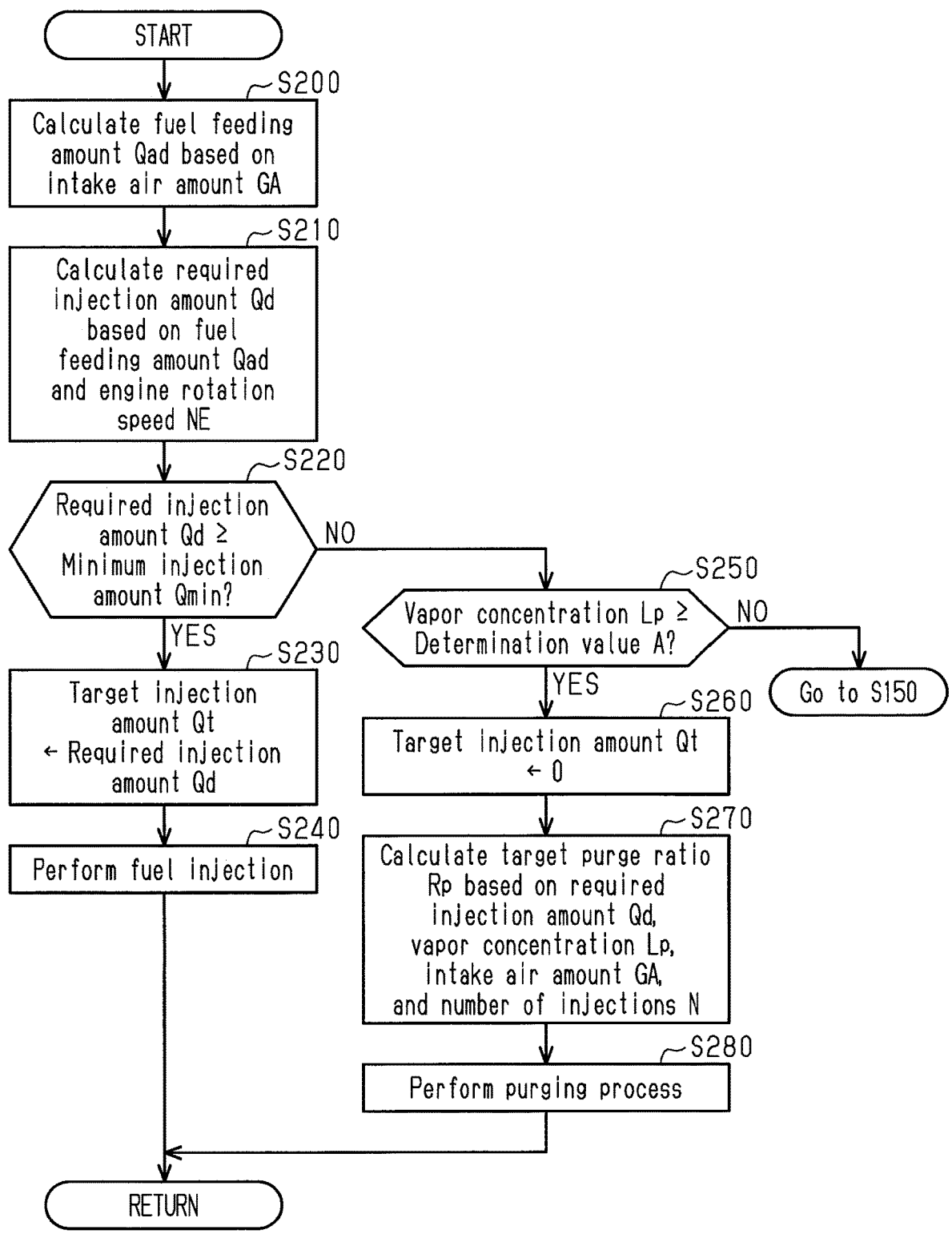
FIG. 3 is a flowchart illustrating the procedure of a fuel supply process executed by the control device shown in FIG. 1.

FIG. 3 illustrates the procedure of a fuel supply process for supplying fuel to the cylinder 11 when the fuel feeding process is being performed. The series of processes illustrated in FIG. 3 is repeatedly implemented by the CPU 110 executing programs stored in the memory 120 of the engine control device 100 when the fuel feeding process is being performed.

When the fuel supply process is started, the CPU 110 first calculates a fuel feeding amount Qad, which is the amount of fuel supplied to the cylinder 11 per unit time when the fuel feeding process is being performed, based on the intake air amount GA (S200).

During the fuel feeding process, the three-way catalyst 22 receives the heat generated by the combustion of fuel performed inside the three-way catalyst 22. Also, the gas passing through the three-way catalyst 22 removes heat from the three-way catalyst 22. The three-way catalyst 22 receives more heat as the fuel feeding amount Qad increases, and more heat is removed from the three-way catalyst 22 as the flow rate of the gas passing through the three-way catalyst 22 increases. During the fuel feeding process during which combustion is not performed in the cylinder 11, the flow rate of the gas passing through the three-way catalyst 22 is substantially the same as that of the intake air amount GA. Thus, when the fuel feeding amount Qad is the same, the catalyst temperature increases more easily as the intake air amount GA decreases. In this regard, in the first embodiment, the fuel feeding amount Qad is calculated to be smaller as the intake air amount GA decreases.

Subsequently, the CPU 110 calculates a required injection amount Qd based on the fuel feeding amount Qad and the engine rotation speed NE. The required injection amount Qd is the injection amount per injection of the fuel injection valve 17 necessary to feed the fuel feeding amount Qad of fuel to the cylinder 11. Specifically, the CPU 110 obtains the number of injections N, which is number of fuel injections in the internal combustion engine 10 per unit time, from the engine rotation speed NE and calculates the required injection amount Qd by dividing the fuel feeding amount Qad by the number of injections N (S210). That is, the CPU 110 calculates the required injection amount Qd, which is the injection amount per injection of the fuel injection valve 17, based on the fuel feeding amount Qad.

Next, the CPU 110 determines whether the required injection amount Qd is greater than or equal to the minimum injection amount Qmin of the fuel injection valve 17 (S220). When the required injection amount Qd is greater than or equal to the minimum injection amount Qmin (S220: YES), the CPU 110 sets a target injection amount Qt of the fuel injection valve 17 to the required injection amount Qd (S230). Then, the CPU 110 executes a control to inject the target injection amount Qt of fuel from the fuel injection valve 17 (S240) and then temporarily ends the fuel supply process.

In S220, when the CPU 110 determines that the required injection amount Qd is less than the minimum injection amount Qmin (S220: NO), the CPU 110 determines whether the most recently calculated vapor concentration Lp (vapor concentration calculated during preceding purging process under a condition in which combustion was performed in cylinder) is greater than or equal to a determination value A (S250). The determination value A is preset to the lower limit value of the vapor concentration Lp necessary for obtaining the fuel feeding amount Qad, which is the fuel amount necessary for increasing the temperature of the three-way catalyst 22.

Then, when it is determined that the vapor concentration Lp is less than the determination value A (S250: NO), the CPU 110 does not supply fuel to the cylinder 11. The CPU 110 executes the process of S150 and ends the catalyst temperature increase control illustrated in FIG. 2.

When it is determined that the vapor concentration Lp is greater than or equal to the determination value A (S250: YES), the CPU 110 sets the target injection amount Qt of the fuel injection valve 17 to "0" so as not to supply fuel from the fuel injection valve 17 to the cylinder 11 (S260).

Subsequently, the CPU 110 calculates the target purge ratio Rp so that the required injection amount Qd of fuel is supplied to the cylinder 11 through the purging process (S270). In this case, the target purge ratio Rp is calculated as described below.

First, when the required injection amount Qd, the target purge ratio Rp, the vapor concentration Lp, the intake air amount GA, and the number of injections N satisfy the following equation (1), the required injection amount Qd of fuel can compensate for the fuel vapor.

$$Qd=(GA/N)\times Rp\times Lp \qquad (1)$$

The value of (GA/N) is the amount of intake air drawn into the cylinder 11 per injection of the fuel injection valve 17. The value obtained by multiplying this value (GA/N) by the target purge ratio Rp and the vapor concentration Lp is the amount of fuel included in the intake air drawn into the cylinder 11 per injection of the fuel injection valve 17. Thus, when the fuel amount is equal to the required injection amount Qd, the required injection amount Qd of fuel can be compensated for by the fuel vapor.

The target purge ratio Rp necessary for supplying the required injection amount Qd of fuel with fuel vapor is calculated based on equation (2), which is a modification of equation (1).

$$Rp=(Qd\times N)/(GA-Lp) \qquad (2)$$

Subsequently, the CPU 110 executes the purging process in accordance with the target purge ratio Rp calculated in S270 (S280). When the purging process is performed, the fuel vapor trapped in the canister 91 is supplied through the purge passage 93 and the intake passage 15 into the cylinder 11. The fuel vapor flows into the three-way catalyst 22 and is burned in the three-way catalyst 22. Then, the CPU 110 temporarily ends the fuel supply process.

The operation and advantages of the first embodiment will now be described.

(1) When the required injection amount Qd is less than the minimum injection amount Qmin of the fuel injection valve 17, fuel is supplied to the cylinder 11 through the purging process when the fuel feeding process is being performed. In the purging process, the fuel vapor generated in the fuel tank 90 is supplied to the cylinder 11 so as not to consume the liquid fuel contained in the fuel tank 90. Therefore, the execution of the fuel feeding process does not lower fuel efficiency because the purging process supplies the cylinder 11 with fuel instead of the fuel injection valve 17 supplying the cylinder 11 with fuel through fuel injection.

(2) As described above, when fuel is supplied to the cylinder 11 when the fuel feeding process is being performed by the fuel injection of the fuel injection valve 17, the fuel injection amount is decreased compared to when the air-fuel mixture is burned in the cylinder 11. Thus, the required injection amount Qd may be less than the minimum injection amount Qmin of the fuel injection valve 17. Accordingly, the required injection amount Qd of fuel may not be supplied to the cylinder 11. In such a case, for example, if fuel injection is prohibited, the fuel feeding process cannot be performed and the catalyst temperature will not be increased. Further, if fuel is injected when the required injection amount Qd is less than the minimum injection amount Qmin and the target injection amount is set to the required injection amount Qd, the amount of fuel actually injected will correspond to the minimum injection amount Qmin. Due to the difference between the required injection amount Qd and the minimum injection amount Qmin, excess fuel may be supplied to the three-way catalyst 22 and overheat the three-way catalyst 22.

In this respect, in the first embodiment, when the required injection amount Qd is less than the minimum injection amount Qmin, the required injection amount Qd of fuel is supplied to the cylinder 11 through the purging process so that the fuel feeding process can be performed when the required injection amount Qd of fuel is being supplied to the cylinder 11.

Accordingly, for example, even when the required injection amount Qd is less than the minimum injection amount Qmin, the fuel feeding process can be performed and the catalyst temperature can be increased. Further, even when the required injection amount Qd is less than the minimum injection amount Qmin, the required injection amount Qd of fuel is supplied to the cylinder 11 so that fuel is not excessively supplied to the three-way catalyst 22. This avoids overheating of the three-way catalyst 22.

(3) In a low temperature environment, the fuel injected from the fuel injection valve 17 may not vaporize. Accordingly, even when the fuel injected from the fuel injection valve 17 during the fuel feeding process is fed to the three-way catalyst 22, the catalyst temperature may not be appropriately increased. In this respect, when the purging process is performed during the fuel feeding process, vaporized fuel is supplied to the three-way catalyst 22. Thus, when the purging process is performed during the fuel feeding process in a low temperature environment, the temperature increasing performance of the three-way catalyst 22 is improved compared to when the fuel injection valve 17 injects fuel.

(4) When the concentration of the fuel vapor supplied to the cylinder 11 is low, the fuel amount necessary for increasing the temperature of the three-way catalyst 22 may not be obtained. In this respect, in the first embodiment, the purging process is performed when the vapor concentration Lp is greater than or equal to the determination value A so that the purging process is performed when the fuel amount necessary for increasing the temperature of the three-way catalyst 22 can be obtained.

Second Embodiment

A control device for an internal combustion engine in accordance with the second embodiment will now be described with reference to FIG. 4.

In the above first embodiment, when the required injection amount Qd is greater than or equal to the minimum injection amount Qmin, the required injection amount Qd of fuel is injected from the fuel injection valve 17 and supplied to the cylinder 11. In contrast, in the second embodiment, the required injection amount Qd of fuel is supplied to the cylinder 11 both by the fuel injection of the fuel injection valve 17 and the drawing of fuel vapor through the purging process. The second embodiment differs from the first embodiment in the processing subsequent to an affirmative determination given in step S220 of FIG. 3. The second embodiment will now be described focusing on the difference.

FIG. 4 illustrates part of the procedure of the fuel supply process in accordance with the second embodiment. The series of processes illustrated in FIG. 4 are also implemented by the CPU 110 executing programs stored in the memory 120 of the engine control device 100.

In the fuel supply process, when an affirmative determination is given in S220 of FIG. 3, that is, when the required injection amount Qd is determined to be greater than or equal to the minimum injection amount Qmin, the CPU 110 executes the same process as that of S250, that is, the CPU 110 first determines whether the most recently calculated vapor concentration Lp is greater than or equal to the determination value A (S300).

Then, when the CPU 110 determines that the vapor concentration Lp is less than the determination value A (S300: NO), the CPU 110 executes the process from S230 in FIG. 3 to inject the required injection amount Qd of fuel from the fuel injection valve 17.

When the CPU 110 determines that the vapor concentration Lp is greater than or equal to the determination value A (S300: YES), the CPU 110 sets the target injection amount Qt of the fuel injection valve 17 to a value obtained by adding a predetermined amount Qα to the minimum injection amount Qmin (S310). In the second embodiment, the predetermined amount Qα is set to "0". Thus, in S310, the target injection amount Qt is set to the minimum injection amount Qmin.

Subsequently, the CPU 110 executes the following processes of S320 to S330 to perform the purging process by supplying the cylinder 11 with an amount of fuel obtained by subtracting the target injection amount Qt set in S310 from the required injection amount Qd.

First, in S320, the CPU 110 subtracts the target injection amount Qt from the required injection amount Qd and sets the calculated value as a purge-required amount Pd. In the second embodiment, the target injection amount Qt is equal to the minimum injection amount Qmin, and the purge-required amount Pd is calculated by subtracting the minimum injection amount Qmin from the required injection amount Qd.

Then, the CPU 110 calculates the target purge ratio Rp so as to supply the purge-required amount Pd of fuel to the cylinder 11 through the purging process (S330). In this case, the target purge ratio Rp can be calculated, for example, based on the purge-required amount Pd, the vapor concentration Lp, the intake air amount GA, and the number of injections N from the following equation (3).

$$Rp=(Pd \times N)/(GA \cdot Lp) \qquad (3)$$

Subsequently, the CPU 110 executes the purging process in accordance with the target purge ratio Rp calculated in S330 and executes fuel injection so that the target injection amount Qt of fuel set in S310 is injected from the fuel injection valve 17 (S340). Then, the CPU 110 temporarily ends the fuel supply process. When the required injection amount Qd is equal to the minimum injection amount Qmin, the purge-required amount Pd is "0". In this case, the CPU 110 only executes fuel injection with the fuel injection valve 17 and does not execute the purging process.

The second embodiment has the following advantage in addition to advantages (1) to (4).

(5) During the fuel feeding process, when the required injection amount Qd of the fuel injection valve 17 is greater than or equal to the minimum injection amount Qmin, the target injection amount Qt of the fuel injection valve 17 is set to the minimum injection amount Qmin, and the target injection amount Qt of fuel is injected from the fuel injection valve 17. Then, the purging process is performed so that the cylinder 11 is supplied with an amount of fuel obtained by subtracting the target injection amount Qt from the required injection amount Qd in addition to the injected amount of fuel.

Therefore, when the required injection amount Qd of fuel is supplied to the cylinder 11, some of the fuel is injected from the fuel injection valve 17 and the rest of the fuel is supplied to the cylinder 11 as fuel vapor through the purging process. Thus, the fuel amount injected from the fuel injection valve 17 when the fuel feeding process is being performed can be reduced compared to when all of the required injection amount Qd of fuel is injected from the fuel injection valve 17. As a result, the fuel feeding process does not decrease the fuel efficiency.

The above-described embodiments may be modified as follows. The above embodiments and the following modifications can be combined as long as the combined modifications remain technically consistent with each other.

In the second embodiment, the predetermined amount Qα is set to "0". Thus, in S310, the target injection amount Qt is set to the minimum injection amount Qmin. Instead, the predetermined amount Qα may be set to a value in a range greater than "0" and smaller than the difference of the minimum injection amount Qmin and the required injection amount Qd. A fuel amount that is greater than or equal to the minimum injection amount Qmin and less than the required injection amount Qd may be set as the target injection amount Qt of the fuel injection valve 17.

Even in this case, when supplying the required injection amount Qd of fuel to the cylinder 11, some of the fuel is injected from the fuel injection valve 17 and the rest of the fuel is supplied to the cylinder 11 as the fuel vapor through the purging process. This limits decreases in the fuel efficiency that would be caused by execution of the fuel feeding process.

In the second embodiment, when the required injection amount Qd of the fuel injection valve 17 is less than the minimum injection amount Qmin, the processes from S250 in FIG. 3 are performed in the same manner as the first embodiment. That is, in the second embodiment, when the required injection amount Qd of the fuel injection valve 17 is less than the minimum injection amount Qmin, the purging process can be performed. Instead, when the required injection amount Qd of the fuel injection valve 17 is less than the minimum injection amount Qmin, the process of S150 can be performed to end the catalyst temperature increase control illustrated in FIG. 2. That is, when the required injection amount Qd is less than the minimum injection amount Qmin, the purging process is not performed.

Even in this case, at least when the required injection amount Qd of the fuel injection valve 17 is greater than the minimum injection amount Qmin, the required injection amount Qd of fuel is supplied to the cylinder 11 by both the fuel injection from the fuel injection valve 17 and the feeding of fuel vapor through the purging process. Accordingly, in contrast with when all of the required injection amount Qd of fuel is injected from the fuel injection valve 17, decreases in the fuel efficiency that would be caused by the execution of the fuel feeding process are limited.

In the fuel supply process, the purging process is performed when the vapor concentration Lp is greater than or equal to the determination value A. However, the determination process of the vapor concentration Lp may be omitted. Even in this case, the catalyst temperature can be increased if the purging process is performed, for example, under the condition that sufficient time has elapsed from the preceding purging process and the concentration of the fuel vapor trapped in the canister 91 is increased to the concentration necessary for increasing the temperature of the three-way catalyst 22.

The spark discharge of the ignition device 19 is stopped when the fuel feeding process is being performed. Instead, when the fuel feeding process is being performed, the ignition device 19 may perform spark discharge during a period in which the air-fuel mixture is not burned in the cylinder 11. For example, even if spark discharge is performed when the piston is located near the bottom dead center in the cylinder 11, the spark discharge will not burn the air-fuel mixture in the cylinder 11. In this way, even if the spark discharge is performed when the fuel feeding process is being performed, the fuel supplied to the cylinder 11 can be fed unburned from the cylinder 11 to the exhaust passage 21.

In the above embodiments, the fuel feeding process is performed when fuel is injected into the intake port 15a by the fuel injection valve 17. Instead, the fuel feeding process can be performed when fuel is injected into the cylinder 11 of an internal combustion engine that includes an in-cylinder injection type fuel injection valve that injects fuel into the cylinder 11.

The system of the hybrid vehicle may differ from the one shown in FIG. 1 as long as the system is configured to control the rotation speed of the crankshaft 14 by driving a motor.

The control device for an internal combustion engine may be embodied as a device that controls an internal combustion engine installed in a vehicle that does not have a power source other than the internal combustion engine. Even in the internal combustion engine installed in such a vehicle, the crankshaft of the internal combustion engine is rotated by the power transmitted from the driving wheels if the vehicle is traveling in a state in which the combustion of air-fuel mixture in the cylinder is stopped, that is, if the vehicle is coasting. Thus, the temperature of the three-way catalyst can be increased by performing the fuel feeding process when the vehicle is coasting and the crankshaft is rotating.

The above engine control device 100 includes the CPU 110 and the memory 120 and executes software processing. However, this is merely an example. For example, the engine control device 100 may include a dedicated hardware circuit (such as ASIC) that executes at least part of the software processing executed in the above embodiments. That is, the engine control device 100 may be modified as long as it has any one of the following configurations (a) to (c). (a) A configuration including a processor that executes all of the above-described processes according to programs and a program storage device such as a memory that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software circuits each including a processor and a program storage device and a plurality of dedicated hardware circuits may be provided. That is, the above processes may be executed in any manner as long as the processes are executed by processing circuitry that includes at least one of a set of one or more software circuits and a set of one or more dedicated hardware circuits. The program storage devices, or computer readable media, include any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A control device for an internal combustion engine, wherein the internal combustion engine includes a fuel tank containing a fuel, a fuel injection valve configured to inject the fuel from the fuel tank, a cylinder into which an air-fuel mixture including the fuel injected by the fuel injection valve is drawn, an igniter configured to spark-ignite the air-fuel mixture drawn into the cylinder, an exhaust passage through which exhaust gas discharged from the cylinder flows, an intake passage configured to draw intake air into the cylinder, a three-way catalyst arranged in the exhaust passage, a canister configured to trap fuel vapor generated in the fuel tank, a purge passage configured to draw the fuel vapor trapped in the canister into the intake passage, and a purge valve configured to adjust a flow rate of the fuel vapor flowing through the purge passage, the control device comprising:

processing circuitry, wherein
the processing circuitry is configured to execute
a purging process that draws the fuel vapor trapped in the canister into the intake passage by controlling the purge valve,
a fuel feeding process that feeds the air-fuel mixture, which includes the fuel supplied to the cylinder, to the exhaust passage without burning the air-fuel mixture in the cylinder, and
a fuel supply process that supplies fuel to the cylinder when the fuel feeding process is being performed, and
the processing circuitry is further configured to perform the fuel supply process by performing
the purging process,
a process for calculating a fuel feeding amount that is an amount of fuel supplied to the cylinder per unit time when the fuel feeding process is being performed,
a process for calculating a required injection amount that is an injection amount per injection of the fuel injection valve necessary to supply the fuel feeding amount of fuel to the cylinder, and
a process for supplying the required injection amount of fuel to the cylinder through the purging process when the required injection amount is less than a minimum injection amount of the fuel injection valve.

2. The control device according to claim 1, wherein the fuel supply process includes
a process for injecting the required injection amount of fuel from the fuel injection valve when the required injection amount is greater than or equal to the minimum injection amount.

3. The control device according to claim 1, wherein the fuel supply process further includes
a process for setting a target injection amount of the fuel injection valve to a fuel amount that is greater than or equal to a minimum injection amount and less than the required injection amount when the required injection amount is greater than the minimum injection amount to inject the target injection amount of fuel from the fuel injection valve and supply an amount of fuel obtained by subtracting the target injection amount from the required injection amount to the cylinder through the purging process.

4. The control device according to claim 3, wherein the fuel supply process includes a process for injecting the required injection amount of fuel from the fuel injection valve when the required injection amount is equal to the minimum injection amount.

5. The control device according to claim 1, wherein the fuel supply process includes performing the purging process when a concentration of the fuel vapor supplied to the cylinder is greater than or equal to a specified determination value.

6. A control device for an internal combustion engine, wherein the internal combustion engine includes a fuel tank containing a fuel, a fuel injection valve configured to inject the fuel from the fuel tank, a cylinder into which an air-fuel mixture including the fuel injected by the fuel injection valve is drawn, an igniter configured to spark-ignite the air-fuel mixture drawn into the cylinder, an exhaust passage through which exhaust gas discharged from the cylinder flows, an intake passage configured to draw intake air into the cylinder, a three-way catalyst arranged in the exhaust passage, a canister configured to trap fuel vapor generated in the fuel tank, a purge passage configured to draw the fuel vapor trapped in the canister into the intake passage, and a purge valve configured to adjust a flow rate of the fuel vapor flowing through the purge passage, the control device comprising:

processing circuitry, wherein
the processing circuitry is configured to execute
a purging process that draws the fuel vapor trapped in the canister into the intake passage by controlling the purge valve,
a fuel feeding process that feeds the air-fuel mixture, which includes the fuel supplied to the cylinder, to the exhaust passage without burning the air-fuel mixture in the cylinder, and
a fuel supply process that supplies fuel to the cylinder when the fuel feeding process is being performed, and
the processing circuitry is further configured to perform the fuel supply process by performing
the purging process,
a process for calculating a fuel feeding amount that is an amount of fuel supplied to the cylinder per unit time when the fuel feeding process is being performed,
a process for calculating a required injection amount that is an injection amount per injection of the fuel injection valve necessary to supply the fuel feeding amount of fuel to the cylinder, and
a process for setting a target injection amount of the fuel injection valve to a fuel amount that is greater than or equal to a minimum injection amount and less than the required injection amount when the required injection amount is greater than the minimum injection amount of the fuel injection valve to inject the target injection amount of fuel from the fuel injection valve and supply an amount of fuel obtained by subtracting the target injection amount from the required injection amount to the cylinder through the purging process.

7. The control device according to claim 6, wherein the fuel supply process includes a process for injecting the required injection amount of fuel from the fuel injection valve when the required injection amount is equal to the minimum injection amount.

8. The control device according to claim 6, wherein the fuel supply process further includes
a process for setting a target injection amount of the fuel injection valve to a fuel amount that is greater than or equal to a minimum injection amount and less than the required injection amount when the required injection amount is greater than the minimum injection amount to inject the target injection amount of fuel from the fuel injection valve and supply an amount of fuel obtained by subtracting the target injection amount from the required injection amount to the cylinder through the purging process.

9. A method for controlling an internal combustion engine, wherein the internal combustion engine includes a fuel tank containing a fuel, a fuel injection valve configured to inject the fuel from the fuel tank, a cylinder into which an air-fuel mixture including the fuel injected by the fuel injection valve is drawn, an igniter configured to spark-ignite the air-fuel mixture drawn into the cylinder, an exhaust passage through which exhaust gas discharged from the cylinder flows, an intake passage configured to draw intake air into the cylinder, a three-way catalyst arranged in the exhaust passage, a canister configured to trap fuel vapor generated in the fuel tank, a purge passage configured to draw the fuel vapor trapped in the canister into the intake passage, and a purge valve configured to adjust a flow rate of the fuel vapor flowing through the purge passage, the method comprising:

performing a purging process that draws the fuel vapor trapped in the canister into the intake passage by controlling the purge valve, performing a fuel feeding process that feeds the air-fuel mixture, which includes the fuel supplied to the cylinder, to the exhaust passage without burning the air-fuel mixture in the cylinder, performing a fuel supply process that supplies fuel to the cylinder when the fuel feeding process is being performed, and performing the fuel supply process by performing
the purging process,
a process for calculating a fuel feeding amount that is an amount of fuel supplied to the cylinder per unit time when the fuel feeding process is being performed,
a process for calculating a required injection amount that is an injection amount per injection of the fuel injection valve necessary to supply the fuel feeding amount of fuel to the cylinder, and
a process for supplying the required injection amount of fuel to the cylinder through the purging process when the required injection amount is less than a minimum injection amount of the fuel injection valve.

* * * * *